June 10, 1952     G. F. LINCKS     2,600,305
ELECTRICAL PROTECTIVE DEVICE
Filed Sept. 20, 1949
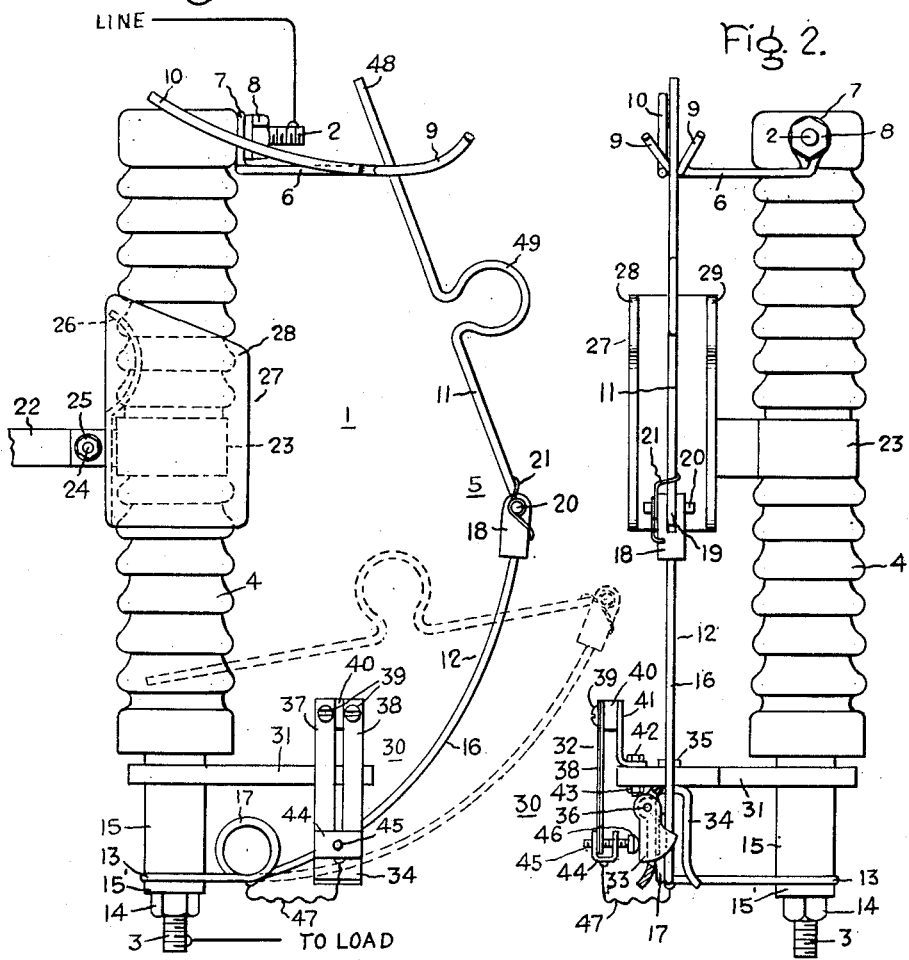
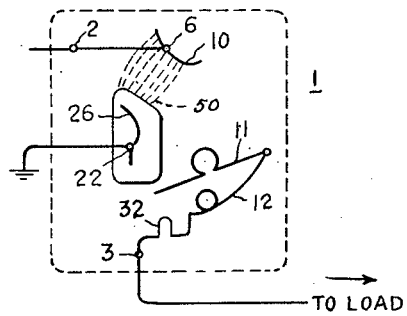
Inventor:
George F. Lincks,
by Ernest C. Britton
His Attorney.

Patented June 10, 1952

2,600,305

UNITED STATES PATENT OFFICE 2,600,305

ELECTRICAL PROTECTIVE DEVICE

George F. Lincks, Pittsfield, Mass., assignor to General Electric Company, a corporation of New York Application September 20, 1949, Serial No. 116,702

4 Claims. (Cl. 175—294)

My invention relates to electrical protective devices of the type known as "fuseless cutout" which are frequently employed in electrical distribution system supplying power to domestic and other types of electrical loads.

In such systems it is common practice to make use of fuseless cutouts in combination with a circuit interrupting device such as an automatic reclosing circuit breaker, to protect transformers and other apparatus being supplied by the distribution system under various types of fault conditions. In the case of a number of such branch circuits to connected apparatus being supplied from a common reclosing circuit breaker a fuseless cutout may be employed in each of the branch circuits to isolate a particular branch circuit, in case of a fault condition therein, from the rest of the system. The cutout is made to operate in response to a fault current prior to the operation of the circuit breaker.

Since a fuseless cutout is generally not a reclosing device, once the cutout has opened, the branch circuit in which it is connected is isolated from the system until the cutout is again closed by an operator. However, should a fuseless cutout fail to isolate the circuit in which it is connected, due to prolonged arcing or other unusual conditions, the reclosing circuit breaker is caused to function by the fault current. Operation of the reclosing circuit breaker causes interruption of the branch circuit wherein a fault condition exists, but in addition all other branch circuits served by the reclosing circuit breaker are also temporarily interrupted.

Such interruptions, which are commonly known as "momentary outages," are annoying to power users due to stoppage of electric clocks and other appliances and are particularly undesirable on circuits to which motors are connected. It is therefore desirable to reduce to a minimum the number of momentary outages occurring in a distribution system.

Another feature of certain fuseless cutout devices which have been used heretofore is the grounding of an interrupted line by the action of a fuseless cutout device following operation thereof due to a fault condition. In certain transformer connections in distribution systems it may be permissible to ground a faulted line. However in other transformer connections, for example a three-phase Y-delta transformer arrangement, it is poor operating practice to connect the Y of a primary winding to ground since the Y point of the other two transformers would likewise be grounded after the recloser restores service on the rest of the system. Accordingly it is desirable to provide a fuseless cutout device which does not permanently ground a faulted line.

Another desirable characteristic of a fuseless cutout device is the incorporation therein of an arc-suppressing device. If, when such a cutout device is caused to operate, the resulting arc occurring at the cutout may be extinguished by suppressing action therein then an associated circuit breaker is not required to function and the number of momentary interruptions or outages occurring in branch circuits served by the breaker, other than the circuit in which a fault exists, is reduced to a minimum.

It is an object of my invention to provide a fuseless cutout device in which the interrupted line is not permanently connected to ground or any other potential but is left isolated in the final open-circuit operating position of the cutout.

It is another object of my invention to provide a fuseless cutout device having incorporated therein arc-suppressing means to facilitate self-extinguishment of the arc by the cutout itself rather than in response to interruption by an associated circuit breaking device.

It is still another object of my invention to provide a fuseless cutout device in which an arc is guided away by an arc-deflecting arrangement from the parts of the cutout to which damage may be done by the arc.

In a preferred embodiment my invention provides a fuseless cutout device in which a switch arm normally engaged with a contact is caused, in response to action of a current-responsive element, such as a thermostatic device, to swing free of the contact through an arc chute in the vicinity of an auxiliary arcing electrode or arcing horn. An arc originally existing between the contact and switch arm is transferred from the switch arm to the arcing horn which is located in the arc chute and which may be connected to ground the opposite side of the power source. The transfer may take place without actual electrical engagement between the contact arm and arcing horn. Following transfer of the arc the switch arm continues to swing through the arc chute, finally reaching a free position in which the arm and the line connected thereto are insulated from ground or the opposite side of the power source.

Other objects and advantages of my invention will become apparent from a consideration of the following description taken in connection with the accompanying drawing and the appended claims, in which the features of my invention believed to be novel are set forth. In the drawing Fig. 1 represents an elevational side view of a fuseless cutout device embodying certain features of my invention; Fig. 2 is an elevational front view of the device shown in Fig. 1; and Fig. 3 is a schematic diagram showing the electrical relationship of certain of the elements shown in Figs. 1 and 2.

Referring now to Figs. 1 and 2, there is shown a fuseless cutout device 1 having an incoming line terminal 2 and an outgoing load terminal 3 supported and insulated from each other by an insulating member 4 and arranged to be interconnected by a switch mechanism 5. Insulator 4 may be of conventional design and of a size suitable for the system voltage employed, and is preferably formed of a ceramic material such as porcelain. Terminal 2 is formed by a threaded lug fastened, as by cementing, in the upper end of insulator 4. Terminal 3 is formed by a threaded lug similarly fastened in the lower end of insulator 4.

A fixed contact 6 is provided for switch mechanism 5 at lug or terminal 2. Contact 6 is formed of a relatively stiff wire doubled back and welded or otherwise fastened upon itself to form a mounting eyelet 7 which is secured to lug 2 by a suitable nut 8, thereby making contact 6 electrically common with terminal 2. Contact 6 is provided with an engaging portion 9 having a generally Y-shaped configuration formed by the ends of the wire. An arcing horn 10 having a generally curved shape is fixed to contact 6 near engaging portion 9 thereof.

The movable arm portion of switch mechanism 5 includes a switch arm 11 and a flipper arm 12 connected together in a hinged relation. Flipper arm 12 is formed of a wire having a high degree of elasticity. One end of flipper arm 12 is provided with a suitable mounting eyelet 13 which is secured to lug or terminal 3 by a suitable nut 14 to hold eyelet 13 in fixed relationship with insulator 4. A pair of insulators 15 and 15' is interposed between lug and eyelet 13 to insulate flipper arm 12 from lug 3. The rotatable portion 16 of flipper arm 12, which is at the opposite end of arm 12 from eyelet 13, is connected thereto through a spring loop or loops 17 wound in the length of wire forming flipper arm 12. Spring loop 17 is wound in such manner that portion 16 of flipper arm 12 is biased in a clockwise direction with respect to insulator 4.

The upper extremity of flipper arm 12 is provided with a generally U-shaped clevis 18 which may be welded or otherwise attached in fixed relation to flipper arm 12. Switch arm 11 is provided at the lower end thereof with a mounting eyelet 19 which permits arm 11 to be rotatably mounted with respect to clevis 18 by the use of a pin 20 arranged to pass through clevis 18 and eyelet 19. Pin 20 is secured with respect to clevis 18 by a press-fit or other suitable locking arrangement. Arms 11 and 12 may be connected electrically by a flexible connector (not shown) where currents are of sufficient magnitude to make such a connection necessary. Switch arm 11 is biased to move in a counterclockwise direction with respect to flipper arm 12 by a spring 21 arranged to engage clevis 18 and switch arm 11.

Cutout device 1 is supported by a hanger 22 attached to a collar 23 which is clamped about the center portion of insulator 4 by a suitable bolt 24 and nut 25, which also serves to fasten hanger 22 to collar 23. A secondary function of hanger 22 is to serve as a terminal to which a return path may be provided for arcing current as will be hereinafter described. An arcing electrode or arcing horn 26, formed of a length of wire and having a generally curved shape at the upper portion thereof, is attached to collar 23 and made electrically common therewith. Arcing horn 26 is positioned approximately in a plane with arcing horn 10 and arms 11 and 12. An arc chute 27 having a pair of generally parallel plates 28 and 29, formed of a material conventionally used for arc-suppressing devices, is suitably mounted on an extension of collar 23 and arranged so that arcing horn 26 is positioned between plates 28 and 29.

Flipper arm 12 is maintained in a latched position against the spring action of loop 17 by a latch mechanism 30 which comprises principally a supporting member 31, a thermostatic element 32 and a latch 33. Support 31 is formed of a conducting material, preferably metal, and is mounted in fixed relation with respect to insulator 4 by the clamping action of insulators 15 and 15' and nut 14. Support 31 is arranged to be electrically common with lug 3. Latch 33 is mounted on a supporting member 34 which is secured in fixed relation to support 31 by a screw 35. Latch 33 is attached to support 34 by a pin 36.

Thermostatic element 32 comprises a pair of bimetallic strips 37 and 38 secured by a pair of screws 39 to a supporting block 40 which in turn is supported by a bracket 41. Bracket 41 is secured to support 31 by a screw 42 and nut 43. The free ends of bimetallic strips 37 and 38 are secured by welding or other fastening means to a generally U-shaped bracket 44. A screw 45 is threadedly attached to bracket 44 and arranged to have the insulating head 46 thereof positioned in the vicinity of latch 33. Bracket 41, support 40 and bracket 44 are all formed of a conducting material such as metal, providing a conducting path from lug 3 to bracket 44. A flexible electrical conductor 47 is provided between bracket 44 and flipper arm 12.

When thermostatic element 32 is at a relatively low temperature, such as normal atmospheric temperature, bimetallic strips 37 and 38 are in a normal or substantially flat position. Under this condition screw 45 is adjusted so that interfering engagement between head 46 and latch 33 is effected to cause latch 33 to engage flipper arm 12. Latch 33 is provided with a cam-like surface so that when flipper arm 12 is raised to a position above latch 33, latch 33 is forced to pivot in a clockwise direction permitting flipper arm 12 to pass thereby. Once latch 33 is past flipper arm 12 the spring action of bimetal elements 37 and 38 forces latch 33 to pivot in a counterclockwise direction to prevent the return of flipper arm 12 from its latched position. However, should the force exerted against latch 33 by screw head 46 be reduced sufficiently the biasing action of spring loop 17 forces flipper arm 12 past latch 33 to an unlatched position.

Thermostatic element 32 is arranged so that when bi-metallic strips 37 and 38 are heated, as by the passage of current therethrough, strips 37 and 38, which are normally flat, are caused to deflect in a clockwise direction with respect to support 40. Such deflection has the effect of releasing latch 33 to permit flipper arm 12 to be biased by spring loop 17 to its unlatched position. Flipper arm 12 is shown in its latched position by solid lines in Figs. 1 and 2, and in its unlatched position by a broken line designated by numeral 12' in Fig. 1.

The length of switch arm 11 is such that disengagement between the end 48 thereof and contact 6 is effected in response to unlatching of flipper arm 12. Once arm 11 is free of contact 6, biasing spring 21 causes rotation of arm 11 in a counter-clockwise direction about pin 20. The length of arm 11 is further arranged so that end 48 passes relatively close to but does not necessarily engage arcing horn 26. The final or free position of arm 11 is indicated in Fig. 1 by a broken line view thereof.

When arms 11 and 12 occupy their unlatched positions cutout device 1 may be considered to be in an open or tripped position. To return arms 11 and 12 to their latched or re-set position, a loop 49 is provided in arm 11 which may be engaged by a suitable switch stick. In such an operation, a force is first applied through loop 49 to move arm 11 clockwise so it will clear contact 6 and then inwardly and upwardly in order to latch flexible arm 12. Then a counter-clockwise force is applied to arm 11 to cause engagement thereof with contact 6 at Y-shaped portion 9. When cutout 1 is in its closed position a conducting path exists therethrough from terminal 2 through contact 6, switch arm 11, flipper arm 12, flexible lead 47, bracket 44, bimetal elements 37 and 38, support 40, bracket 41, and support 31 to terminal 3.

Referring now to Fig. 3, the electrical relationship of the principal elements shown in Figs. 1 and 2 is shown in schematic form. Cutout 1 which is represented within a closed broken line is shown in its open position. Cutout 1 is connected in series relation with a line in a branch circuit of an electrical distribution system. The line is connected to input terminal 2 and the load to output terminal 3.

In normal operation, cutout device 1 remains closed while the currents therethrough and in particular through thermostatic element 32 are normal in magnitude. Flipper arm 12 is maintained in its latched position by latch 33 and thermostatic element 32, and switch arm 11 is maintained in electrical engagement with contact 6. If the current through cutout 1 becomes abnormal due to a fault condition in the line therebeyond, abnormal heating occurs in bimetallic strips 37 and 38 of thermostatic element 32 causing deflection thereof with release of flipper arm 12 by latch 33. Under such a condition, switch arm 11 is disengaged from contact 6. As arm 11 moves away from contact 6, the current flowing previously therebetween becomes an arc between contact 6 and arm 11. As end 48 of arm 11 passes in the vicinity of arcing horn 26 there is a tendency for the arc to be transferred from arm 11 to arcing horn 26 causing the arc then to exist between arcing horns 26 and 10, the latter being electrically common with contact 6. As previously indicated support 22 forms an auxiliary terminal for cutout 1 and may be connected to ground in the case of a grounded distribution system or to the opposite line to provide a return path for arcing current flowing to arcing horn 26.

Following the transfer of the arc from arm 11 to arcing horn 26, arm 11 drops to its free position in which it is insulated from ground. Referring to Fig. 3, an arc 50 is shown between arcing horns 10 and 26 and a return path for the current in arc 50 from terminal 22 is represented as a ground connection to terminal 22.

It will be seen that arms 11 and 12 are not connected to ground in their open position and accordingly terminal 3 and the line connected thereto are not grounded but are insulated from ground.

Transfer of the arc from arm 11 to arcing horn 26 in general creates a short circuit condition in the branch circuit with a tendency for the arc to increase substantially in magnitude over the previous arc which had a return path through a relatively high-impedance fault beyond cutout device 1. Therefore it is desirable not only to provide arc-suppressing means in cutout 1 but to provide arc-deflecting means should the arc fail to be extinguished. The arc between arcing horns 26 and 10 is caused to pass between plates 28 and 29 of arc chute 27. The presence of arc chute 27 has a tendency to extinguish the arc. However, should the arc persist, a tendency is provided, by properly shaping and positioning arcing horns 10 and 26, for the arc to be deflected away from the operating elements of cutout 1 to minimize the danger of damage thereto.

Should an arc fail to be extinguished by action of arc chute 27 the relatively high short circuit current causes opening of an automatic reclosing circuit interrupter such as a circuit breaker (not shown) normally connected in the distribution system with cutout device 1. Opening of the circuit interrupter causes interruptions of the current flowing in the form of arc 50 between arcing horns 10 and 26 of cutout 1 and thereby causes extinguishment of the arc. Thus when the circuit interrupter recloses cutout 1 is in an open condition, thereby isolating the branch circuit connected thereto in which a fault condition is assumed to exist, from the remainder of the distribution system. Following removal of the fault condition, cutout device 1 may again be closed by an operator in the manner described to restore service to the branch circuit.

By the use of a cutout device constructed in accordance with my invention a circuit protective device is provided in which a faulted line is insulated from grounds or another return path following the opening of the line by the protective device. Such isolation of a line is particularly desirable in the case of many transformer connections in common use on distribution systems. A cutout device of the type described additionally provides an arc-suppressing element which is highly effective in extinguishing the arcs accompanying opening of the cutout device. Therefore the number of operations required of a reclosing circuit breaker is reduced to a minimum, resulting in a minimum of momentary outages on branch circuits in which fault conditions do not exist. Furthermore, should an arc persist for an appreciable period of time an arc-deflecting arrangement is provided to keep the arc away from operating elements of the cutout to prevent damage thereto until extinguishment of the arc is effected by opening of an associated circuit breaking device.

Although in the embodiment of my invention herein shown and described I have included arc-suppressing means in the form of an arc chute to aid in suppressing and deflecting an arc occurring in the fuseless cutout device, I wish it to be understood that my invention is not limited to the case wherein such an arc-suppressing element is included. A cutout device may equally well be constructed in accordance with my invention to provide, without regard to arc suppression or deflection, the particular feature of not permanently connecting a faulted line to the return path following opening of the cutout.

While I have shown and described a preferred embodiment of my invention, it will be understood that my invention may well take other forms and I, therefore, aim in the appended claims to cover all such changes and modifications as fall within the true spirit and scope of my invention.

What I claim as new and desire to secure by Letters Patent of the United States is:

1. An electrical protective device for connection between a load terminal connected to a load line and a supply terminal connected to a supply line comprising a switch including a supply contact mounted on a support of insulating material and electrically connected to said supply line, a switch arm having means for mounting on said support and electrically insulated from said load terminal and from ground thereby, said switch arm having one end movable along a path between a latched position in engagement with said supply contact and a neutral position, means biasing said switch arm towards said neutral position, and holding means connected in series between said load terminal and said switch arm for retaining said switch arm in engagement with said supply contact, said holding means being responsive to overcurrents therein in excess of a predetermined value to release said switch arm, a grounded auxiliary electrode positioned adjacent said path of movement of said switch arm at a point intermediate its latched and neutral positions and insulated from said supply contact and said switch arm, whereby when said arm traverses said path from said latched position to said neutral position arc current flowing between said supply contact and said switch arm is transferred to flow between said supply contact and said auxiliary electrode and thence to ground allowing said load terminal to remain at a potential above ground.

2. An electrical protective device for connection between a load terminal connected to a load line and a supply terminal connected to a supply line comprising switching means including a supply contact mounted on a support of insulating material and connected to said supply line, a pivoted switch arm having means for mounting on said support and electrically insulated from said load terminal and from ground thereby, said switch arm having an end movable along a path between a latched position in engagement with said supply contact and a neutral position, said switch arm being biased towards said neutral position, means electrically connected between said load terminal and said switch arm for holding said switch arm in engagement with said supply contact including a latching element and means for locking said latching element, said means being responsive to a predetermined value of current flowing therethrough to release said arm, a grounded auxiliary electrode positioned adjacent said path of movement of said switch arm at a point intermediate its latched and neutral positions and insulated from said supply contact and said switch arm, whereby when said arm traverses said path from said latched position to said neutral position, arc current flowing between said supply contact and said switch arm is transferred to flow between said supply contact and said auxiliary electrode and thence to ground allowing said load terminal to remain at a potential above ground.

3. An electrical protective device comprising an elongated support insulator, a contact electrically connected to a line terminal mounted at one end of said insulator, a load terminal mounted at the opposite end of said insulator, a switch mechanism including a flipper arm of resilient conducting material insulated from said load terminal with one end thereof fixedly mounted at said opposite end of said insulator, said flipper arm normally biased for rotation of the free end thereof in one direction with respect to said insulator, a switch arm of conducting material having one end thereof electrically connected to and pivotally mounted on said free end of said flipper arm and normally biased for rotation in a different direction with respect to said insulator, the opposite end of said switch arm being engageable with said line terminal contact, a grounded auxiliary electrode mounted on said insulator intermediate the ends thereof substantially in the plane of rotation of said switch arm and spaced a predetermined distance therefrom and a predetermined distance from said line terminal contact, holding means electrically connected in series between said load terminal and said flipper arm to normally hold the free end of said flipper arm from rotation in said one direction and said opposite end of said switch arm in engagement with said line terminal contact, said holding means being responsive to overcurrents therein in excess of a predetermined value to permit release of said arms for rotation in said one direction of the free end of said flipper arm, disengagement of said switch arm from said line terminal contact and rotation thereof in said different direction whereby the arc established between said switch arm and said line terminal contact is transferred to said grounded auxiliary electrode.

4. An electrical protective device comprising an elongated support insulator, a contact electrically connected to a line terminal mounted at one end of said insulator, an arcing horn electrically connected to said contact, a load terminal mounted at the opposite end of said insulator, a switch mechanism including a flipper arm of resilient conducting material insulated from said load terminal with one end thereof fixedly mounted at said opposite end of said insulator, said flipper arm normally biased for rotation of the free end thereof in a clockwise direction with respect to said insulator, a switch arm of conducting material having one end thereof electrically connected to and pivotally mounted on said free end of said flipper arm and normally biased for counterclockwise rotation with respect thereto, the opposite end of said switch arm being engageable with said line terminal contact, a grounded arcing horn mounted on said insulator intermediate the ends thereof substantially in the plane of rotation of said switch arm and spaced a predetermined distance therefrom and a predetermined distance from said first mentioned arcing horn, an arc chute comprising a pair of plates mounted on said insulator in parallel relationship on opposite sides of and spaced from said grounded arcing horn, a latch engageable with said flipper arm to normally hold the free end thereof from clockwise rotation and said opposite end of said switch arm in engagement with said line terminal contact, releasable holding means electrically connected in series between said flipper arm and said load terminal to normally hold said latch engageable with said flipper arm, said means being responsive to a predetermined value of current flowing through said terminals to release said latch and permit clockwise rotation of said flipper arm and counterclockwise rotation of said switch arm whereby the arc current flowing between said switch arm and said line contact is transferred to flow between the arcing horn electrically connected thereto and said grounded arcing horn and thence to ground, said arc chute being effective to aid in distinguishing said arc.

GEORGE F. LINCKS.

REFERENCES CITED

The following references are of record in the file of this patent:

UNITED STATES PATENTS

| Number | Name | Date |
|---|---|---|
| 1,269,526 | Creighton | June 11, 1918 |
| 1,574,979 | Legg | Mar. 2, 1926 |
| 1,822,112 | Schofield | Sept. 8, 1931 |
| 2,349,609 | Brown et al. | May 23, 1944 |
| 2,502,179 | Smith | Mar. 28, 1950 |
| 2,545,660 | Graybill | Mar. 20, 1951 |